United States Patent
Yamaguchi et al.

(10) Patent No.: US 7,824,820 B2
(45) Date of Patent: Nov. 2, 2010

(54) ELECTROLYTE FILM AND SOLID POLYMER FUEL CELL USING THE SAME

(75) Inventors: Takeo Yamaguchi, Kawasaki (JP); Kazushige Yamamoto, Ibaraki (JP); Shin-ichi Nakao, Tokyo (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/506,720

(22) PCT Filed: Mar. 6, 2003

(86) PCT No.: PCT/JP03/02631

§ 371 (c)(1), (2), (4) Date: Mar. 10, 2005

(87) PCT Pub. No.: WO03/075386

PCT Pub. Date: Sep. 12, 2003

(65) Prior Publication Data

US 2005/0147860 A1     Jul. 7, 2005

(30) Foreign Application Priority Data

Mar. 7, 2002 (JP) .................. 2002-061916

(51) Int. Cl.
    *H01M 8/10* (2006.01)
(52) U.S. Cl. ............ 429/491; 429/479; 521/27
(58) Field of Classification Search ............ 429/46, 429/12, 479, 491; 521/27
    See application file for complete search history.

(56) References Cited

U.S. PATENT DOCUMENTS

| 3,423,366 A | 1/1969 | DeBrunner |
| 3,542,703 A | 11/1970 | De Brunner |
| 5,910,357 A * | 6/1999 | Hachisuka et al. ....... 428/315.5 |
| 6,465,120 B1 | 10/2002 | Akita |
| 6,523,699 B1 | 2/2003 | Akita |
| 6,565,763 B1 * | 5/2003 | Asakawa et al. ............ 216/56 |

(Continued)

FOREIGN PATENT DOCUMENTS

EP    1 202 365 A1    5/2002

(Continued)

OTHER PUBLICATIONS

Office Action dated May 16, 2007, from U.S. Appl. No. 10/506,717, filed Sep. 7, 2004.

(Continued)

*Primary Examiner*—Jane Rhee
(74) *Attorney, Agent, or Firm*—Christensen O'Connor Johnson Kindness PLLC

(57) ABSTRACT

An electrolyte membrane having a porous base material having pores filled with a first polymer capable of conducting a proton, wherein the porous base material comprises i) at least one second polymer selected from the group consisting of polyolefins and ii) a third polymer having double bond in the polymer, and contains a crosslinked second polymer wherein molecules of the second polymer are crosslinked with one another; and a fuel cell, particularly a solid polymer fuel cell, more specifically a direct methanol polymer fuel cell, using the electrolyte membrane. The electrolyte membrane is excellent in the inhibition of permeation of methanol, exhibits no or reduced change in its area, and is excellent in proton conductivity.

10 Claims, 2 Drawing Sheets

U.S. PATENT DOCUMENTS 6,716,553 B1 * 4/2004 Fujita et al. .................. 429/145
2005/0118479 A1 6/2005 Yamaguchi

FOREIGN PATENT DOCUMENTS

| JP | 05-031343 A | 2/1993 |
| JP | 08-180890 A | 7/1996 |
| JP | 11-335473 A | 12/1999 |
| JP | 2000-149965 A | 5/2000 |
| JP | 2001-135328 A | 5/2001 |
| JP | 2001-247741 A | 9/2001 |
| JP | 2002-83612 A | 3/2002 |
| JP | 2003-22823 A | 1/2003 |
| JP | 2003-86021 A | 3/2003 |

OTHER PUBLICATIONS

Office Action dated Mar. 4, 2008, from U.S. Appl. No. 10/506,717, filed Sep. 7, 2004.

* cited by examiner

ELECTROLYTE FILM AND SOLID POLYMER FUEL CELL USING THE SAME

TECHNICAL FIELD

The present invention relates generally to a fuel cell, and more particularly to a direct methanol solid polymer fuel cell.

BACKGROUND ART

The recent encouraged global activities of environmental protection put strong-demands for restrictions on greenhouse gases and NOx gas production. In order to reduce the total amount of such exhaust gases, practical application of fuel cell system to automobile is thought to be very useful.

Polymer electrolyte fuel cells (PEFCs) have several advantages: operative at a low temperature; high power density; and generation of water alone during power generating reaction. Among all, PEFCs using methanol as fuel are thought to be a promising power source for an electric automobile since they enables fuel supply in a liquid form like gasoline.

PEFCs are classified into two types: reformed methanol-type polymer electrolyte fuel cells which involve reforming methanol into hydrogen-containing gas using a reformer; and direct methanol polymer fuel cells (DMFCs) which utilize methanol directly without using a reformer. Practical use of direct methanol polymer fuel cells is expected due to their great advantages: 1) weight-saving is possible since direct methanol polymer fuel cells do not require a reformer; 2) resistance against frequent start and stop operations; 3) significantly improved load change response; and 4) substantially reduced catalyst poisoning.

However, although as the electrolytic substance for PEFC using methanol fuel, the electrolyte membrane is required to have the following; i) the inhibition of permeation of methanol (the electrolytic substance is impermeable to methanol); ii) durability, more particularly, heat resistance for operation a high temperature (80° C. or higher); iii) no or reduced change in surface area following the wetting with a solution and drying at starting and stopping; iv) proton conductivity; v) thin film formability; and vi) chemical durability, any electrolyte membrane which could sufficiently satisfy these requirements has not been made available yet.

Further, in from a viewpoint of a portable type methanol fuel PEFC, i) the inhibition of permeation of methanol is important and operation-ability near a normal temperature is important, while the durability at a high temperature becomes less important.

DISCLOSURE OF INVENTION

Accordingly, an object of the present invention is to provide an electrolyte membrane satisfying the above-mentioned requirements. In particular, the object of the present invention is to provide an electrolyte membrane excellent in i) the inhibition of permeation of methanol, iii) no or reduced change in surface area, and iv) proton conductivity.

In addition to or other than the above-mentioned objects, the object of the present invention is also to provide a fuel cell having the electrolyte membrane satisfying the requirements, particularly a solid polymer fuel cell, and more particularly direct methanol solid polymer fuel cell.

After intense studies, the present inventors have found that the following inventions can accomplish the above-described objects.

<1> An electrolyte membrane comprising a porous substrate, wherein pores of the porous substrate are filled with first polymer having proton conductivity, and the porous substrate is comprised of i) a second polymer which is at least one selected from the group of polyolefins, and ii) a third polymer having a double bond in the molecule of the third polymer, and the porous substrate comprises a crosslinked second polymer wherein the second polymers are crosslinked with one another.

<2> In the above item <1>, the third polymer may be at least one of polymers having an alicyclic skeleton structure and polybutadiene.

<3> In the above item <1> or <2>, the third polymer may be polynorbornene.

<4> In any one of the above items <1> to <3>, the second polymer may comprise polyethylene.

<5> In any one of the above items <1> to <4>, the second polymer may be polyethylene and the third polymer may be polynorbornene.

<6> In any one of the above items <1> to <5>, one end of the first polymer may be bound to surface of pores of the porous substrate.

<7> In any one of the above items <1> to <6>, pores of the porous substrate may be further filled with forth polymer having proton conductivity.

<8> A fuel cell comprising the electrolyte membrane described in any one-of the above items <1> to <7>.

<9> A solid polymer fuel cell comprising the electrolyte membrane described in any one of the above items <1> to <7>.

<10> A direct methanol solid polymer fuel cell comprising the electrolyte membrane described in any one of the above items <1> to <7>.

<11> A solid polymer fuel cell comprising a cathode, an anode, and an electrolyte sandwiched therebetween, wherein the electrolyte comprises a porous substrate, wherein pores of the porous substrate are filled with first polymer having proton conductivity, and the porous substrate is comprised of i) a second polymer which is at least one selected from the group of polyolefins, and ii) a third polymer having a double bond in the molecule of the third polymer, and the porous substrate comprises a crosslinked second polymer wherein the second polymers are crosslinked with one another.

<12> In the above item <11>, the third polymer may be at least one of polymers having an alicyclic skeleton structure and polybutadiene.

<13> In the above item <11> or <12>, the third polymer may be polynorbornene.

<14> In any one of the above items <11> to <13>, the second polymer may comprise polyethylene.

<15> In any one of the above items <11> to <14>, the second polymer may be polyethylene and the third polymer may be polynorbornene.

<16> In any one of the above items <11> to <15>, one end of the first polymer may be bound to surface of pores of the porous substrate.

<17> In any one of the above items <11> to <16>, pores of the porous substrate may be further filled with forth polymer having proton conductivity.

<18> In any one of the above items <11> to <17>, the solid polymer fuel cell may be a direct methanol solid polymer fuel cell.

BEST MODE FOR CARRYING OUT THE INVENTION

Figure 1:
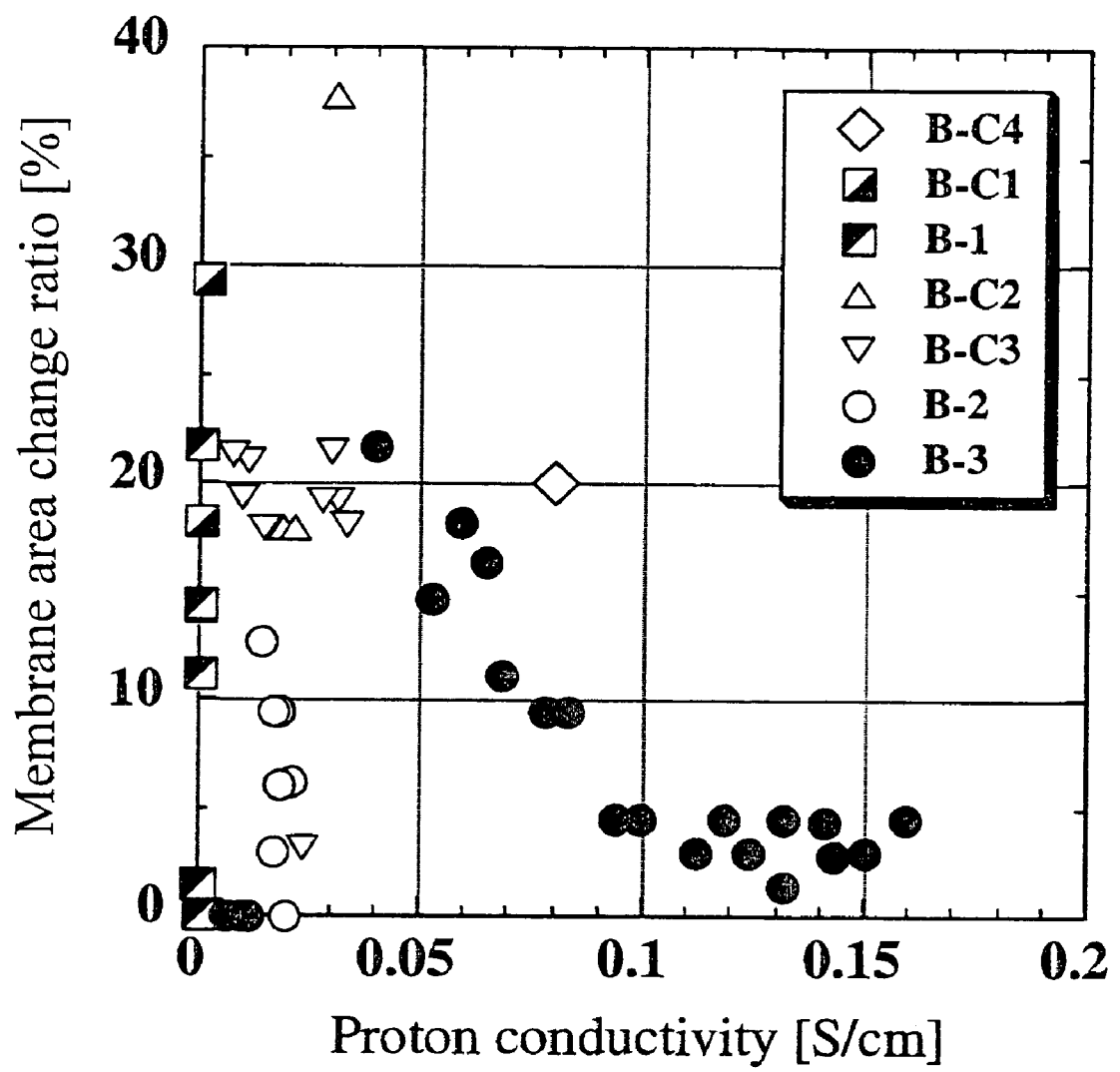
FIG. 1 is a graph showing the results of measurement of change in membrane surface area and results of measurement of proton conductivity.

Hereinafter, the present invention will be described more in details.

An electrolyte membrane of the present invention comprises a porous substrate having the above-described properties. In this regard, the porous substrate comprises i) at least one second polymer selected from the group consisting of polyolefins and the second polymer is preferably crosslinked by itself. In addition to the second polymer, the substrate may be comprised of ii) a third polymer having a double bond in the polymer itself, for example, at least one polymer selected from polymers having an alicyclic skeleton structure and polybutadiene.

The second polymer may be polyolefins such as polyethylene, polypropylene, polybutylene, 4-methylpentene and the like.

Among them, as the second polymer, polyolefins are preferable because of their stain proofing property, corrosion resistance, and economical property. In particular, high density polyethylene, low density polyethylene, an ultra high molecular weight polyethylene and the like are preferable. The high density polyethylene or the ultra high molecular weight polyethylene is more preferable in terms of the strength of the porous substrate to be obtained.

The second polymer is more preferable to be crosslinked partially or entirely in terms of the heat resistance and the membrane strength. Although it depends on the third polymer, which will be described later, the crosslinking may be carried out by one or more means selected from a group consisting of heat, UV rays, and electron beam. The crosslinking may eliminate the double bond existing in the third polymer completely or partially. The crosslinking using the heat treatment is preferable since a finely porous film to be obtained, i.e., the substrate of the present invention, has stability in the structure. Execution of the crosslinking treatment improves the heat resistance of the finely porous film to be obtained, i.e., the substrate of the present invention.

Furthermore, in the case of carrying out the crosslinking by heating treatment, it is possible to employ various methods such as a one-step heating method of carrying out heating once, a multi-step heating method of carrying out heating at first at a low temperature and thereafter at higher temperatures, and a temperature increasing type heating method of carrying out heating while the temperature being increased. However, it is desirable that the treatment is carried out without deteriorating the characteristics of the substrate of the present invention such as air permeability and diameter of pore penetrating through membrane. The heating treatment temperature may be 40 to 140° C., preferably 90 to 140° C. The treatment time may be preferably 0.5 to 14 hours.

In the case of carrying out crosslinking using UV rays treatment, the treatment can be carried out as follows: the finely porous film, i.e., the substrate of the present invention, is immersed in a methanol solution containing a polymerization initiator, without further treatment after film formation, dried to remove solvent, and then, the substrate is subjected to radiation by a mercury lamp or the like.

In the case of carrying out crosslinking using electron beam treatment, the treatment can be carried out as follows: for example, the finely porous film, i.e., the substrate of the present invention, is subjected to radiation of 0.1 to 10 Mrad dose, without further treatment after film formation. The ambient atmosphere at the time of radiation may be under air atmosphere, similarly to that in the heating treatment, or under an inert gas atmosphere such as nitrogen gas or argon gas, in order to control the crosslinking state.

Further, the porous substrate of the present invention may be comprised of ii) the third polymer having a double bond in the polymer itself. The third polymer may be polybutadiene and polymers having an alicyclic skeleton structure. Examples of the polymers having an alicyclic skeleton structure may include ring-opening polymer compounds of bicyclo[3.2.0]hept-6-ene, bicyclo[4.2.0]oct-7-ene and their derivatives; norbornene derivatives such as bicyclo[2.2.1]hept-5-ene (referred to herein as norbornene) and bicyclo[2.2.1]hept-5-ene-2,3-dicarboxymethyl ester; ring-opening polymers of bicyclo[2.2.2]oct-2-ene and its derivatives; and ring-opening polymers of dicyclopentadiene, tetracyclododecene and their derivatives; and the like. Among them, polybutadiene and at least one of polymers having norbornene skeleton structure may be preferably used and polynorbornene may be more preferably used.

In the case of using polybutadiene, the polybutadiene may include cis-type 1,4-polybutadiene, trans-type 1,4-polybutadiene, and 1,2-polybutadiene. Polybutadiene containing a large quantity of cis-type 1,4-polybutadiene skeleton structure is preferable since it easily takes a bending structure and it is easy to promote double bond reaction. In particular, polybutadiene containing cis-type 1,4-polybutadiene skeleton structure in a ratio of 30% or more is preferable.

In the case of using the third polymer, the amount of the third polymer may be 1 to 50 parts by weight, preferably 1 to 40 parts by weight, more preferably 1 to 35 parts by weight based on 100 parts by weight corresponding to the total amount of the third polymer and the second polymer.

The porous substrate of the present invention can be produced by a conventionally known film formation method such as a dry film formation method and a wet film formation method. For example, after polymer and solvent are kneaded and formed into a sheet while being melted by heating, the sheet is extruded into one or more axial directions and after the solvent is removed by extraction, the sheet is dried to obtain a sheet-like porous substrate.

In this case, the solvent is not particularly limited as long as the solvent can dissolve the above-mentioned second polymer and the third polymer if exists. Examples of the solvent may include aliphatic or cyclic hydrocarbons such as nonane, decane, undecane, dodecane, decalin, and liquid paraffin, or mineral oil fractions having boiling points corresponding to those of the exemplified hydrocarbons. Non-volatile solvents such as paraffin oils are preferable.

In the case of using the solvent, its amount is as follows. In the case the total of the second polymer, the third polymer and the solvent is set to be 100 parts by weight, the amount of the solvent may be 50 to 95 parts by weight, preferably 50 to 90 parts by weight. In the case of using the solvent in the above-mentioned range, the porous substrate to be obtained may have desired characteristics such as porosity and strength.

In the case the porous substrate of the present invention contains the third polymer, the second polymer itself may be crosslinked by radiating one or more selected from a group consisting of heat, UV rays, electron beams and visible light rays, after the film formation according to the above-mentioned method or well-known method.

The porosity of the porous substrates of the present invention may be 5 to 95%, preferably 5 to 90%, more preferably 10 to 90%, most preferably 10 to 80%.

The average pore diameter may be in a range of 0.001 to 100 μm.

The thickness of the substrates is 100 μm or thinner, preferably 1 to 60 μm, more preferably 5 to 50 μm.

It is preferable for the porous substrates of the present invention to have no or reduced change in surface area at the time of wetting or drying. In this regard, it is preferable that the porous substrates of the present invention may have modulus in tension of 500 to 5000 MPa, preferably 1000 to 5000 MPa; and breaking strength of 50 to 5000 MPa, preferably 100 to 500 MPa.

An electrolyte membrane of the present invention may be obtained by filling the surface of a substrate of a porous material, particularly the inner surface of the fine pores, with a first polymer. The method for filling with the first polymer may be a conventionally known method for filling or a method for filling with the first polymer in such a state that one end side is bound to the inner surface of the fine pores. Further, a forth polymer, which may be same as or different from the first polymer, may be filled other than the first polymer.

The first polymer is preferable to have ion exchange groups. Furthermore, the term "ion exchange groups" used herein mean groups retaining protons such as $-SO_3-$ derived from $-SO_3H$ and easy to release them. They exist like pendants in the first polymer and proton conductivity is generated by filling the fine pores with the polymer. Accordingly, the first polymer may be derived from a first monomer comprising an ion exchange group.

Examples of the method for forming bonding of one end of the first polymer to the inner surface of the fine pores are as follows. For example, a substrate is excited by plasma, UV rays, electron beam, or γ-ray to form reaction starting points in at least the inner surface of fine pores of the substrate and the first monomer is brought into contact with the reaction starting points to bond the first polymer. Also, a chemical method using a silane coupler may be employed for bonding the first polymer to the inner surface of the fine pores. Further, a general polymerization method for obtaining the first polymer by filling the fine pores with the first monomer and then carrying out polymerization reaction of the first monomer in the inside of the fine pores and chemically bonding the obtained first polymer to the substrate by using a coupling agent including the above-mentioned silane coupler.

In the present invention, in the case of obtaining the first polymer whose one end is bound to the surface of the fine pores and then filling the pores with the first polymer, a plasma graft polymerization method is preferable to be employed. Furthermore, the plasma graft polymerization can be carried out by a liquid phase method or a well-known vapor phase polymerization method. For example, the plasma graft polymerization method is carried out as follows: producing reaction starting points in the substrate surface as well as the inner surface of the pores after the substrate is irradiated by plasma, and then carrying out graft polymerization of the first monomer, which will form the first polymer, in the substrate surface and inside of the pores by bringing the first monomer into contact with the starting points by a known liquid phase polymerization method. More detailed contents of the plasma graft polymerization method are described in precedent patent applications applied by some of the inventors of the invention; Japanese Patent Application Laid-Open (JP-A) Nos. 3-98632, 4-334531, 5-31343, 5-237352, 6-246141, and WO 00/54351 (these documents are entirely interpolated herein as references).

Monomers which can be used as the first monomer of the present invention may preferably be sodium acrylsufonate (SAS), sodium methacrylsulfonate (SMS), sodium p-styrenesulfonate (SSS), and acrylic acid (SS). However, the monomer usable for the present invention is not limited to the above-exemplified compounds and may include monomers having strongly acidic groups in their structures such as a vinyl group, a sulfonic acid group, and phosphonic acid group; monomers having weak acid groups such as a carboxyl group; monomers having strong base group and weak base groups such as primary, secondary, tertiary, and quaternary amines; and their ester derivatives such as, for example, allyamine, allylsulfonic acid, allylphosphonic acid, methacrylsulfonic acid, methacrylphosphonic acid, vinylsulfonic acid, vinylphosphonic acid, styrenesulfonic acid, styrenephosphonic acid, acrylamide sulfonic acid or phosphonic acid derivatives, ethyleneimine, and methacrylic acid. Furthermore, in case a salt type monomer such as sodium salts is used, these salts are preferably to provide polymer and then to convert it proton type.

Only one of the above-mentioned monomer may be used to form a homopolymer. Alternatively, two or more of above-mentioned monomers may be used to form a copolymer. The first polymer whose one end is bound to the surface of the pores of the substrate may be a homopolymer or a copolymer.

Proton conductivity of the electrolyte membrane may depend on the type of first monomer(s) and/or forth monomer (s) described hereinafter to be used. Desirably, material(s) having higher proton conductivity may be used. Proton conductivity of the electrolyte may also depend on the degree of polymerization of the polymer filled in the pores.

In the case of using the forth polymer, the forth polymer may be same as or different from the first polymer. That is, as a forth monomer to be the forth polymer, one or two types of the polymers and the monomers exemplified for the first polymer and the forth monomer may be selected. Preferable examples of the forth monomer are those exemplified for the above-mentioned forth monomers and vinylsulfonic acid in addition to them. In the case, one kind of monomer is selected as the forth monomer, the forth polymer is a homopolymer and in the case two or more kinds of monomers are selected as the forth monomer, the forth polymer may be copolymers.

In the case of using the forth polymer, the forth polymer is preferably chemically and/or physically bonded to the first polymer. For example, the forth polymer may entirely chemically be bonded to the first polymer or the forth polymer may entirely physically be bonded to the forth polymer. Further, a portion of the forth polymer may chemically be bonded to the first polymer and the rest of the forth polymer may physically be bonded to the first polymer. Furthermore, the chemical bond may include bonding of the first polymer and the forth polymer. The bond can be formed by making the first polymer carrying reactive groups and causing reaction of the reactive groups with the forth polymer and/or the forth monomer. The physical bonding state may be the state that the first and the forth polymers are entangles with each other.

Use of the forth polymer makes it possible to suppress permeation (cross-over) of methanol, prevent elution or leakage of the entire polymer filling the pores out of the pores, and improve the proton conductivity. In particular, chemical bonding and/or physical bonding of the first polymer and the forth polymer makes it possible to prevent the elution or leakage of the entire polymer filling in the pores out of the pores. Even in the case the polymerization degree of the first polymer is low, existence of the forth polymer, especially the forth polymer with a high polymerization degree increases the proton conductivity of the electrolyte membrane to be obtained.

The electrolyte membrane of the present invention may be preferably used for a fuel cell, particularly a direct type methanol solid polymer fuel cell or a reforming type methanol solid polymer fuel cell. The electrolyte membrane of the present invention may be particularly preferable to be used for the direct methanol solid polymer fuel cell.

Configuration of a methanol fuel cell will be briefly described hereinafter.

The methanol fuel cell is comprised of an anode and a cathode, and the electrolyte membrane sandwiched between both electrodes. The methanol fuel cell may be a reforming type methanol fuel cell comprising a reformer in anode side.

The cathode may have a conventionally known configuration and comprises a catalyst layer and a support layer for supporting the catalyst in this order from the electrolyte side.

Also, the anode may have a conventionally known configuration and comprises a catalyst layer and a support layer for supporting the catalyst in this order from the electrolyte side.

EXAMPLES

Hereinafter, the present invention will be described more in details along with following Examples, however the scope of the present invention is not limited by these Examples.

Preparation Example of Substrate -1-

20 parts by weight of a polymer composition containing 12 wt % of a powder of a ring-opening polymer of norbornene (trade name: Norsorex NB; weight average molecular weight (hereinafter Mw): 2,000,000 or higher; manufactured by ZEON CORPORATION) and 88 wt % of a ultra high molecular weight polyethylene (Mw: 3,000,000), and 80 parts by weight of liquid paraffin were evenly mixed like a slurry, and dissolved and kneaded for about 60 minutes at a temperature of 160° C. by using a small type kneader. The resulting kneaded mixture was sandwiched by rolls or metal plates cooled at 0° C. to quench the mixture into a sheet-like form and obtain a sheet type resin.

The sheet type resin was heat pressed at a temperature of 115° C. into a sheet thickness of 0.4 to 0.6 mm and simultaneously biaxially extended at a temperature of 115° C. into 3.5×3.5 times as width in the vertical and transverse directions, and then, solvent removal treatment was carried out by using heptane to obtain a finely porous film. The obtained finely porous film was heated in air; i) at 95° C. for 3 hours and then ii) at 120° C. for 2 hours to obtain a porous substrate A-1. The porous substrate A-1 had the following properties; a thickness: 25 μm, a pore diameter: 0.1 μm (the surface average pore diameter based on SEM observation); a porosity: 40%; an elastic modulus: 2,500 MPa; and the breaking strength: 270 MPa. The polyethylene in the porous substrate A-1 was found crosslinked.

Preparation Example of Substrate -2-

20 parts by weight of a polymer composition containing 7 wt % of a powder of a ring-opening polymer of norbornene (trade name: Norsorex NB; Mw: 2,000,000 or higher; manufactured by ZEON CORPORATION), 23 wt % of polyethylene (Mw: 300,000), and 70 wt % of a ultra high molecular weight polyethylene (Mw: 3,000,000), and 80 parts by weight of liquid paraffin were evenly mixed like a slurry, and dissolved and kneaded for about 60 minutes at a temperature of 160° C. by using a small type kneader. The resulting kneaded mixture was sandwiched by rolls or metal plates cooled at 0° C. to quench the mixture into a sheet-like form and obtain a sheet type resin.

The sheet type resin was heat pressed at a temperature of 115° C. into a sheet thickness of 0.4 to 0.6 mm and simultaneously biaxially extended at a temperature of 118° C. into 3.5×3.5 times as width in the vertical and transverse directions, and then, solvent removal treatment was carried out by using heptane to obtain a finely porous membrane. The obtained finely porous membrane was heated in air; i) at 85° C. for 6 hours and then ii) at 120° C. for 2 hours to obtain a porous membrane A-2. The porous membrane A-2 had the following properties; a thickness: 24 μm, a pore diameter: 0.1 μm (the surface average fine pore diameter based on SEM observation); a porosity: 37%; an elastic modulus 1,500 MPa; and the breaking strength: 150 MPa. The polyethylene in the porous base material A-1 was found crosslinked.

Example 1

The porous membrane A-1 obtained in the above-mentioned manner was used to form an electrolyte. As a first polymer to be filled, a polymer derived from acrylic acid (hereinafter, abbreviated as AA) was used.

Specifically, an aqueous AA solution was prepared and the substrate A-1 was immersed in the aqueous solution and AA was polymerized. The polymerization conditions were as follows.

A mixed solution containing 98 mol % of AA, 1 mol % of divinylbenzene as a crosslinking agent, and 1 mol % of 2,2'-azobis (2-amidinopropane) dihydrochloride (hereinafter, abbreviated as V-50) was prepared. The substrate A-1 was immersed in the solution, and visible light rays were radiated for 6 minutes, and then the resulting substrate was heated at 50° C. for 18 hours in an oven.

The porous substrate was taken out of the solution, washed with water, and dried, to obtain a membrane B-1 in which a polymer derived from AA was formed. The weight of the membrane B-1 was measured after drying, and the polymerization degree was calculated by comparison of the weight with the weight before the polymerization. The polymerization degree was 0.4 to 1.5 mg/cm². The thickness after the polymerization was 27 μm each.

Figure 2:
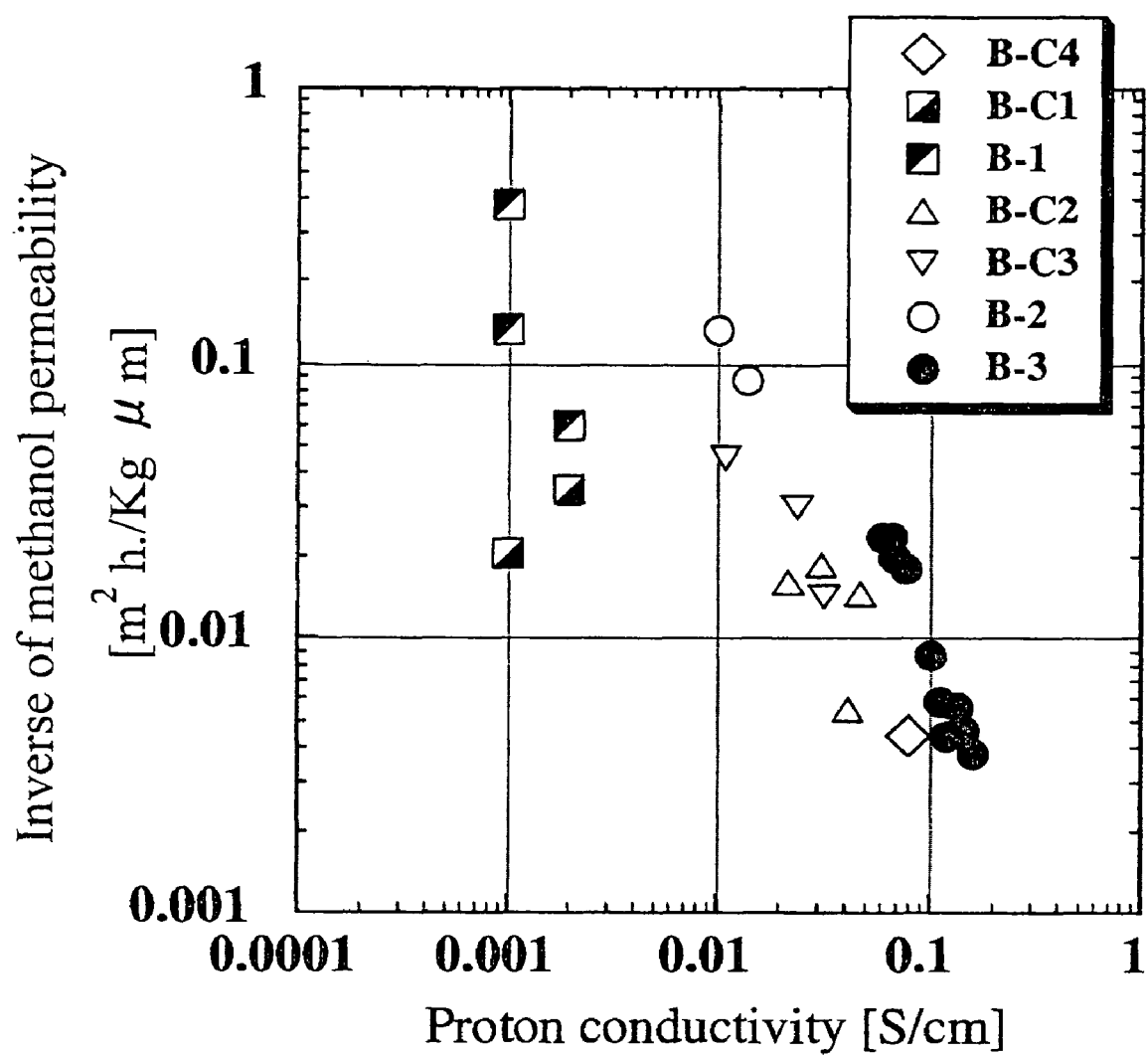
FIG. 2 is a graph showing the results of evaluation of methanol permeability and results of measurement of proton conductivity.

The obtained membrane B-1 was subjected to 1) measurement of ratio of change in surface area; 2) evaluation of methanol permeability; and 3) measurement of proton conductivity. The respective measurement methods or the evaluation method are described below. The obtained results are shown in FIGS. 1 and 2. FIG. 1 is a graph of the results of measurement of change in surface area and proton conductivity. FIG. 2 is a graph of the results of the methanol permeability evaluation and the results of the proton conductivity measurement.

<Measurement of ratio of change in surface area of membrane>

The surface area ($S_d$) of each membrane in dry state was measured. After the membrane was immersed in water at 25° C. and kept overnight, the surface area ($S_s$) of each membrane in water was measured. The change φs (%) in the surface area between the dry state ($S_d$) and the swollen state ($S_s$) was calculated according to the following equation A and evaluated.

$$\phi s = \{100(S_s - S_d)\}/S_s \quad \text{(Equation A)}.$$

<Evaluation of methanol permeability>

A gas permeation experiment at 50° C. was carried out. The supply solution was methanol/water (weight ratio)=1/9. The experiment was carried out by reducing the pressure in the permeation side until the permeated gas flow rate became steady. The apparatus employed had the following structure. That is, each membrane was sandwiched in a cell made of a stainless steel and the above-mentioned supply solution was poured on the top faced of the membrane and stirred. A heater and a temperature measuring resistor were inserted in the supply solution to keep the temperature at 50° C. The down face of the membrane was connected with a vacuum pump via a cold trap. The down face of the membrane, that is the permeation side, was pressure-reduced and the methanol-steam permeating the membrane was collected in the cold trap. The collected vapor (solid state in the cold trap) was heated and melted, and taken out in form of a liquid. The total permeation flux was measured based on its weight, and also the permeated vapor composition was measured by gas chromatography. The date for several hours until the membrane permeability was stabilized were ignored and the value when the membrane permeability became constant with the lapse of time was evaluated as the permeability in the steady state. The permeation flux of the methanol after the membrane reached the steady state was generally about 0.01 to 5 kg/m²h.

<Proton conductivity>

The membrane to be measured was swollen in the water (temperature: 25° C.). And then, the swollen membrane was sandwiched between two platinum plate electrodes, to prepare a sample for measuring proton conductivity. Alternating current impedance was measured by using HP 4194A, manufactured by Hewlett-Packard Development Company, L.P.

Example 2

The membrane B-2 was obtained by using the following AAVS type polymer instead of AA used in Example 1.

<AAVS type>

An aqueous solution containing 79 mol % of acrylic acid, 20 mol % of sodium vinylsulfonate, and 1 mol % of divinylbenzene as a cross-linking agent was prepared such that concentration of acrylic acid, sodium vinylsulfonate and divinylbenzene was 70 wt %. A water-soluble azo type initiator: V-50 was added to the solution at a ratio of 1 mol % based on 100 mol % of the total of the acrylic acid and vinylsulfonate, to obtain a solution. The substrate A-1 was immersed in the solution, and visible light was radiated to the substrate for 6 minutes. Then, the substrate was heated at 50° C. for 18 hours in an oven.

And then, the excess polymer on the surface of the membrane was removed. After ion exchange using a considerably excess amount of 1 N hydrochloric acid, the membrane was sufficiently washed and further dried at 50° C. in the oven, to obtain a membrane B-2. The resulting membrane B-2 was subjected to 1) measurement of change in surface area; 2) evaluation of methanol permeability; and 3) measurement of proton conductivity, as measured in Example 1. The obtained results are shown in FIGS. 1 and 2.

Example 3

The membrane B-3 was obtained by using the following ATBS type polymer instead of AA used in Example 1.

<ATBS type>

An aqueous solution was prepared by diluting a monomer mixture containing 99 mol % of 2-acrylamido-2-methylpropanesulfonic acid (hereinafter, abbreviated as "ATBS") and 1 mol % of a cross-linking agent, methylenebis (acrylamide) with water to 50% by weight, and 1 mol % of a water-soluble azo-type initiator V-50 was added to the mixture of ATBS and methylenebis(acrylamide) based on 100 mol % of the mixture of ATBS and methylenebis (acrylamide). The substrate A-1 was immersed in the solution, and then, visible light was radiated to the substrate for 6 minutes, the resulting substrate was heated at 50° C. in an oven for 18 hours.

Then, the excess polymer on the surface of the membrane was removed. After ion exchange using a considerably excess amount of 1N hydrochloric acid, the membrane was sufficiently washed with distilled water, and dried at 50° C. in an oven, to obtain the membrane B-3. The membrane B-3 was also subjected to 1) measurement of change in surface area alteration; 2) evaluation of methanol permeability; and 3) measurement of proton conductivity, as described in Example 1. The obtained results are shown in FIGS. 1 and 2.

Comparative Example 1

A membrane B-C1 was obtained in the same manner as Example 1, except that a porous polytetrafluoroethylene membrane (membrane thickness 70 μm; pore diameter: 100 nm) was used instead of the substrate A-1 used in Example 1.

Comparative Example 2

A membrane B-C2 was obtained in the same manner as Example 2, except that a porous polytetrafluoroethylene membrane (membrane thickness: 70 μm; pore diameter: 100 nm) was used instead of the substrate A-1 used in Example 2.

Comparative Example 3

A membrane B-C3 was obtained in the same manner as Example 2, except that porous polytetrafluoroethylene membrane (membrane thickness: 70 μm; pore diameter: 50 nm) was used instead of the membrane A-1 obtained in Example 2.

Comparative Example 4

A membrane B-C4 was obtained in the same manner as Example 1, except that Nafion 117 was used instead of the membrane B-1 obtained in Example 1.

With respect to the membranes B-C1 to B-C4, similarly to the membranes B-1 to B-3, 1) measurement of change in surface area; 2) evaluation of methanol permeability; and 3) measurement of proton conductivity were carried out. The obtained results are shown in FIGS. 1 and 2.

FIG. 1 shows that the membrane B-1 using the substrate A-1 according to the present invention exhibits reduced change in surface area. More, the membrane B-2 using the substrate A-1 according to the present invention has less change in surface area than that of the membranes B-C2 and B-C3. Further, FIGS. 1 and 2 show that the membrane B-3 has properties required for an electrolyte membrane, i.e., the membrane B-3 has high proton conductivity and less change in surface area.

The invention claimed is:

1. An electrolyte membrane comprising a porous substrate, wherein pores of the porous substrate are filled with a first polymer having proton conductivity, thereby to impart proton conductivity to said electrolyte membrane, and the porous substrate is comprised of i) a second polymer which is at least one selected from the group of polyolefins, and ii) a third polymer having a carbon-carbon double bond in the molecule of the third polymer, and the porous substrate comprises a crosslinked second polymer wherein the second polymers are crosslinked with one another, and wherein the electrolyte membrane has a proton conductivity of 0.05 S/cm or more and a membrane area change ratio of 20% or less.

2. The electrolyte membrane according to claim 1, wherein said third polymer is at least one of polymers having an alicyclic skeleton structure and polybutadiene.

3. The electrolyte membrane according to claim 1, wherein said third polymer is polynorbornene.

4. The electrolyte membrane according to claim 1, wherein said second polymer comprises polyethylene.

5. The electrolyte membrane according to claim 1, wherein said second polymer is polyethylene and said third polymer is polynorbornene.

6. The electrolyte membrane according to claim 1, wherein one end of said first polymer is bound to surface of pores of said porous substrate.

7. The electrolyte membrane according to claim 1, wherein pores of the porous substrate are further filled with forth polymer having proton conductivity.

8. A fuel cell comprising said electrolyte membrane according to claim 1.

9. A solid polymer fuel cell comprising said electrolyte membrane according to claim 1.

10. A direct methanol solid polymer fuel cell comprising said electrolyte membrane according to claim 1.

* * * * *